I. W. PEPPLE.
VEHICLE TIRE.
APPLICATION FILED AUG. 5, 1916.

1,266,852.

Patented May 21, 1918.

Witnesses

Inventor
J. W. Pepple
By
Attorneys

UNITED STATES PATENT OFFICE.

JOHN W. PEPPLE, OF SAN ANTONIO, TEXAS.

VEHICLE-TIRE.

1,266,852.

Specification of Letters Patent.   Patented May 21, 1918.

Application filed August 5, 1916. Serial No. 113,250.

*To all whom it may concern:*

Be it known that I, JOHN W. PEPPLE, a citizen of the United States, residing at San Antonio, in the county of Bexar, State of Texas, have invented certain new and useful Improvements in Vehicle-Tires; and I do hereby declare the following to be a full, clear, and exact description of the invention, such as will enable others skilled in the art to which it appertains to make and use the same.

This invention relates to tires such as are used for automobiles and other like vehicles in which it is desirable to absorb the shocks incident to rapid travel over roads by means of an inherent resiliency in the tire.

It is well known that a large proportion of motor vehicle troubles and accidents arise from the employment of the ordinary pneumatic tire in which the tire is kept distended by means of air pressure since any loss of this pressure, due to punctures or the like immediately renders the tire inefficient.

It is also well recognized that solid or cellular tires of the ordinary type fail to possess the proper resilience necessary for rapid travel and that while such solid or substantially solid tires operate well on slow moving vehicles such as trucks and the like, they are highly inefficient on pleasure cars and other cars where the speed used exceeds those used in heavy hauling.

The principal object of the present invention is to provide an improved form of tire which, while not depending on air pressure for the maintenance of its shape under normal conditions, will nevertheless inherently possess all of the elasticity and resiliency of a pneumatic tire.

Another important object of the invention is to provide an improved form of tire wherein the stresses tending to distort the tire under service conditions will be taken care of and distributed in such manner as to prevent undue distortion or stress on any part of the tire.

A third important object of the invention is to provide an improved form of tire wherein the minor distortions, such as occur when running over small pebbles and the like, will be localized so that those parts of the tire intended to resist heavier stresses will not be subject to the wear incident to a multiplicity of minor strains.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and :—

Figure 1:
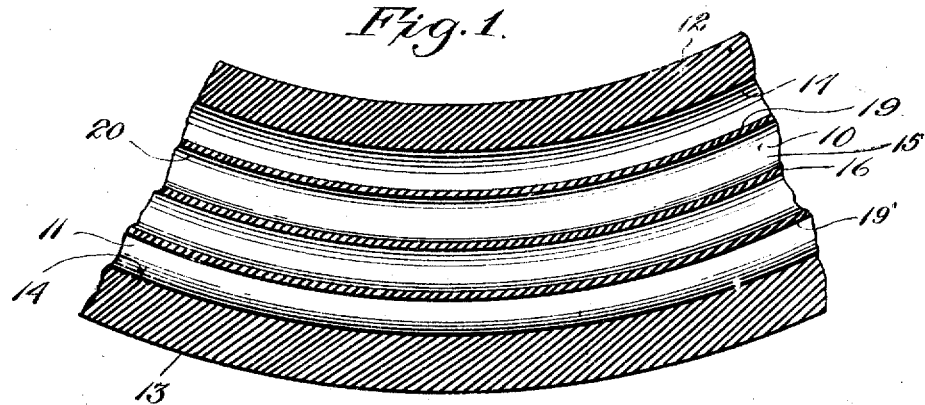
Figure 1 is a vertical longitudinal section through a portion of a tire constructed in accordance with this invention.
Figure 2:
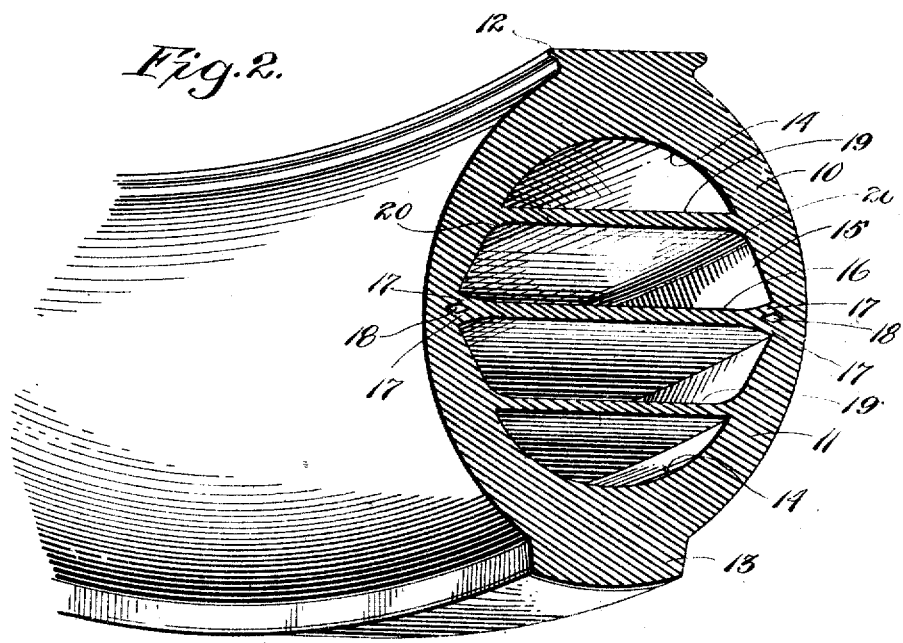
Fig. 2 is a perspective view of a portion of such tire, the tire being shown in transverse section.

In carrying out the objects of the invention I preferably form the tire of rubber, which may or may not be reinforced in the usual manner with canvas or the like, and the tire is of general oval cross section, the portions at opposite sides of the transverse median line of the tire being so arranged that they form opposed arch structures the inner of which is indicated at 10 and may be termed "the rim arch" while the outer is indicated at 11 and forms the "tread arch". The crown of the rim arch is provided with a beaded projection 12 for attachment of the device to the usual wheel rim. The crown of the tread arch is provided with an abruptly thickened portion 13 which forms the ground engaging portion of the tire, the sides being substantially perpendicular to the outer face of the portion 13 so as to provide anti-skidding means. These arches have a common central spring line. The inner periphery of each arch is arcuate at the crown as indicated at 14, the radius of the curve being such as to provide for a gradual decrease in the thickness of the walls toward the spring line. The haunches of each arch have their inner peripheries divergent toward the spring line on the straight lines in cross section as indicated at 15, so that the thinnest places in the tire are disposed centrally between the respective arch crowns. Extending across the center of the tire is a tension web 16 which has its lateral edges bifurcated, the furcations being diverged and connected or merged into the sides of the tire as at 17, these furcations lying approximately at right angles to the inner surfaces of the haunches of the arches, so that a pocket 18 is formed at each side of the web 16, these pockets and the web extending around the entire periphery of the tire. I also preferably employ between each crown and the web 16 a second tension web 19 connected to the sides of the tire and provided at the points where the edges merge into said sides with fillets 20. These last mentioned webs 19 are preferably located so that they lie between the curved inner periphery of each crown and the haunches of the arch.

It is a well known fact in arch construction that arches fail in three different ways. In the first of these the crown collapses; secondly, the haunches spread apart at their top ends; thirdly, the feet spread apart. With the present tire the space within the tire is filled with air usually at normal air pressure so that due to the presence of this air and the natural resiliency of the tire any tendency to distortion of the crown portions due to running over small obstructions, such as pebbles and the like, will be localized because the webs 16 and 19 will tend to prevent spreading of the feet or haunches of the arches, the inherent resiliency of the tire permitting it to give sufficiently at the crown. If, however, a greater shock takes place then both the haunches and the feet of the arches may spread apart sufficient to absorb this shock since the resiliency of the webs 16 and 19 permits such spreading, said resiliency causing the tire to at once resume its original shape as soon as the stress producing the shock ceases. Moreover, by reason of the fillet and the bifurcations of the central web 16 the stresses incident to such distortion are well distributed throughout the sides of the tire so that there is no possibility of tearing the webs from said sides. It will be seen that when stress is put upon the web 16 by the spreading of the arches, the pull will be through the furcations at the edges of this web which will tend to move the furcations toward each other, the pockets 18 permitting such movement. If the edges of the web 16 were not bifurcated the greatest stress would come at the center of the edge of the web and the tendency to tear the web from the sides of the tire would be greatly increased.

As disclosed in the drawings, the crown portions of the arches are formed interiorly as broad circular arcs while each side portion of the complete tire also constitutes the arc of a circle, these latter arcs extending substantially from crown to crown of the two arches.

It will be noted that I have here shown three webs but it will be obvious that where heavier or lighter loads may require support the number of webs may be increased or diminished as I see fit.

It is also obvious that many minor changes may be made in the form and construction of the invention without departing from the material principles thereof. It is not therefore desired to confine the invention to the exact form herein shown and described but it is wished to include all such as properly come within the scope of the appended claim.

Having thus described the invention, what is claimed as new, is:—

A tire of the class described comprising a body formed of an inverted and an erect arch joined foot to foot, the side walls of the arches being connected by a transverse elastic web at the common spring line of the arches, said connecting web having its lateral edges bifurcated longitudinally, said furcations being divergent and connected to the side walls at spaced points to provide lateral pockets, said furcations lying approximately at right angles to the surfaces of the side walls at their points of connection thereto.

In testimony whereof, I affix my signature, in the presence of two witnesses.

JOHN W. PEPPLE.

Witnesses:
L. N. GILLIS,
I. COSGROVE.